US012591269B2

(12) United States Patent
Ouyang

(10) Patent No.: US 12,591,269 B2
(45) Date of Patent: Mar. 31, 2026

(54) ELECTRONIC DEVICE

(71) Applicant: VIVO MOBILE COMMUNICATION CO., LTD., Guangdong (CN)

(72) Inventor: Wenbin Ouyang, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 197 days.

(21) Appl. No.: 18/615,193

(22) Filed: Mar. 25, 2024

(65) Prior Publication Data

US 2024/0231426 A1      Jul. 11, 2024

Related U.S. Application Data

(63) Continuation of application No. PCT/CN2022/120174, filed on Sep. 21, 2022.

(30) Foreign Application Priority Data

Sep. 26, 2021     (CN) .......................... 202111131876.6

(51) Int. Cl.
*G06F 1/16* (2006.01)
(52) U.S. Cl.
CPC .......... *G06F 1/1616* (2013.01); *G06F 1/1679* (2013.01); *G06F 1/1681* (2013.01)
(58) Field of Classification Search
CPC combination set(s) only.
See application file for complete search history.

(56) References Cited

U.S. PATENT DOCUMENTS

| | | | | |
|---|---|---|---|---|
| 11,294,431 B2 * | 4/2022 | Torres | .................. | G06F 1/1681 |
| 11,379,015 B2 * | 7/2022 | Lin | ...................... | G06F 1/1677 |
| 11,416,039 B2 * | 8/2022 | Hsu | ...................... | G06F 1/1681 |
| 11,859,656 B2 * | 1/2024 | Yaginuma | ............. | G06F 1/1681 |
| 11,889,644 B2 * | 1/2024 | Yang | ..................... | H04M 1/022 |
| 12,085,123 B2 * | 9/2024 | Yang | ..................... | G06F 1/1616 |
| 12,429,925 B2 * | 9/2025 | Zhang | ................. | H04M 1/0247 |

(Continued)

FOREIGN PATENT DOCUMENTS

| | | |
|---|---|---|
| CN | 109495621 A | 3/2019 |
| CN | 208820828 U | 5/2019 |

(Continued)

OTHER PUBLICATIONS

International Search Report and Written Opinion for Application No. PCT /CN2022/120174, dated Nov. 30, 2022, 9 Pages.

*Primary Examiner* — Lisa Lea-Edmonds
(74) *Attorney, Agent, or Firm* — BROOKS KUSHMAN P.C.

(57) ABSTRACT

An electronic device is disclosed. The electronic device includes a first housing, a second housing, a screen assembly, a shaft assembly, and a transmission member. The first housing and the second housing are in rotational fit with each other through the shaft assembly. The transmission member sleeves on the shaft assembly. The transmission member is capable of moving in an axial direction of the shaft assembly. The first housing is provided with a first pushing portion. The transmission member is provided with a first guide surface. The first pushing portion is abutted on the first guide surface. A first section and a second section of the screen assembly are disposed in the first housing and the second housing, respectively.

13 Claims, 8 Drawing Sheets

(56)        References Cited

U.S. PATENT DOCUMENTS

| | | | |
|---|---|---|---|
| 2018/0067520 A1* | 3/2018 | Määttä | G06F 1/1681 |
| 2020/0081487 A1 | 3/2020 | Lin | |
| 2021/0011525 A1* | 1/2021 | Lin | G06F 1/1681 |
| 2021/0076520 A1 | 3/2021 | Yen et al. | |
| 2021/0157368 A1* | 5/2021 | Lin | G06F 1/1681 |
| 2021/0240232 A1 | 8/2021 | Cheng et al. | |
| 2021/0293269 A1* | 9/2021 | Yaginuma | A45C 3/02 |
| 2021/0381289 A1* | 12/2021 | Hsu | H04M 1/022 |
| 2022/0147114 A1* | 5/2022 | Torres | G09F 9/301 |
| 2023/0229203 A1* | 7/2023 | Hsiang | G06F 1/1624 |
| | | | 361/679.27 |
| 2023/0337380 A1* | 10/2023 | Ye | G06F 1/1652 |
| 2024/0231426 A1* | 7/2024 | Ouyang | G06F 1/1652 |
| 2025/0076938 A1* | 3/2025 | Hsiang | G06F 1/1616 |
| 2025/0123657 A1* | 4/2025 | Larsen | G06F 1/1681 |

FOREIGN PATENT DOCUMENTS

| | | | |
|---|---|---|---|
| CN | 110138916 A | 8/2019 | |
| CN | 110417964 A | 11/2019 | |
| CN | 209881844 U | 12/2019 | |
| CN | 112540652 A | 3/2021 | |
| CN | 212727085 U | 3/2021 | |
| CN | 113883158 A | 1/2022 | |

* cited by examiner

ELECTRONIC DEVICE

CROSS-REFERENCE TO RELATED APPLICATIONS

This application is a continuation of International Application No. PCT/CN2022/120174 filed on Sep. 21, 2022, which claims priority to Chinese Patent Application No. 202111131876.6 filed on Sep. 26, 2021, which are incorporated herein by reference in their entireties.

TECHNICAL FIELD

This application belongs to the technical field of communication devices, and specifically relates to an electronic device.

BACKGROUND

With the development of technologies, the development of electronic devices is increasingly rapid, and users' requirements on the electronic devices are increasingly high. At present, flexible screens are also widely used in electronic devices, to form foldable electronic devices.

A folding problem often occurs in a folding process of a foldable electronic device. For example, when a foldable electronic device is folded inwards, because a bending radius at the position of a hinge is small, the following problem is easily caused: A flexible screen is creased or damaged due to excessive squeezing. When the foldable electronic device is folded outwards, because a bending radius at the position of the hinge is large, the following problem is easily caused: The flexible screen is excessively stretched and deformed, or even cracked. It can be learned that the following problem is caused in a folding process of an existing foldable electronic device: A flexible screen is damaged easily. As a result, the service life of the flexible screen is short.

SUMMARY

Embodiments of this application aim to provide an electronic device.

This application is implemented as follows:

An electronic device is provided, including a first housing, a second housing, a screen assembly, a shaft assembly, and a transmission member. The first housing and the second housing are in rotational fit with each other through the shaft assembly. The transmission member sleeves on the shaft assembly. The transmission member is capable of moving in an axial direction of the shaft assembly.

The first housing and/or the second housing each are/is provided with a first pushing portion. The transmission member is provided with a first guide surface. The first pushing portion is abutted on the first guide surface.

A first section of the screen assembly is in sliding fit with the first housing. A second section of the screen assembly is disposed in the second housing. One of the transmission member and the first section of the screen assembly is provided with a second pushing portion. The other one of the transmission member and the first section of the screen assembly is provided with a second guide surface. The second guide surface is disposed aslant relative to the axial direction of the shaft assembly. The second pushing portion is abutted on the second guide surface.

In a case that the first housing rotates relative to the second housing towards the side away from the screen assembly, the first pushing portion slides along the first guide surface, and pushes the transmission member to slide in the axial direction of the shaft assembly; and the transmission member slides along the second guide surface through the second pushing portion, and drives the first section of the screen assembly to move towards the second section of the screen assembly.

Figure 1:
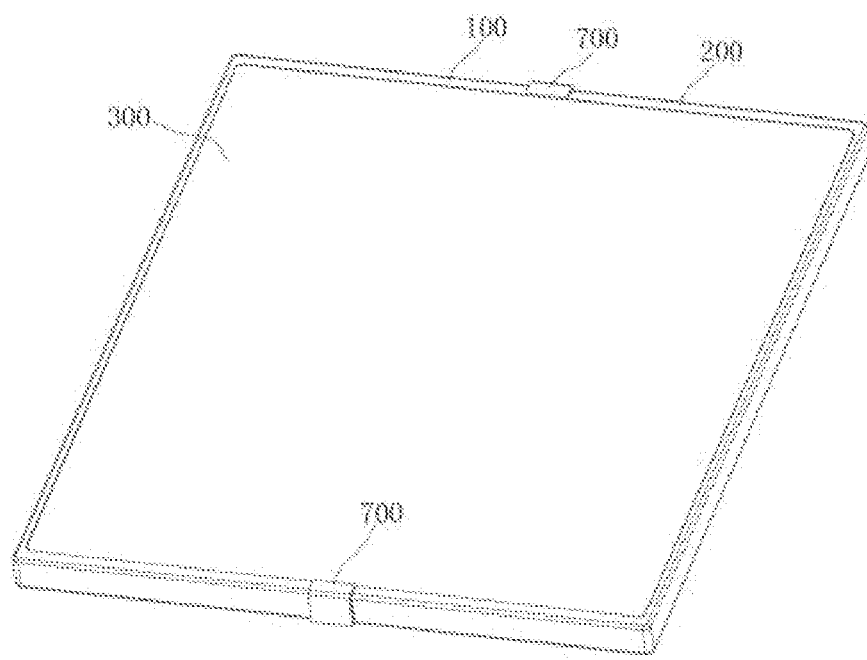
FIG. 1 is a schematic diagram of an electronic device in a folded state according to an embodiment of the present invention.

Reference numerals in the accompanying drawings are as follows: 100: first housing; 110: first teeth structure; 120: sliding groove; 130: second fixing block; 200: second housing; 210: first pushing portion; 220: second teeth structure; 300: screen assembly; 310: second guide surface; 320: first support plate; 330: second support plate; 340: flexible screen; 350: guide block; 360: third guide surface; 370: first fixing block; 400: shaft assembly; 410: first rotating shaft; 420: second rotating shaft; 430: middle shaft; 431: limiting groove; 500: transmission member; 510: first guide surface; 520: second pushing portion; 530: limiting protrusion; 540: sleeve; 550: first transmission block; 551: rotating portion; 560: third pushing portion; 570: second transmission block; 600: elastic member; 610: external housing; 620: spring; 630: push rod; 700: rotation limiting member.

DETAILED DESCRIPTION

The following clearly describes technical solutions in embodiments of this application with reference to accompanying drawings in the embodiments of this application. Apparently, the described embodiments are some but not all of the embodiments of this application. All other embodiments obtained by a person of ordinary skill in the art based on the embodiments of this application without creative efforts shall fall within the protection scope of this application.

The terms "first", "second", and the like in this specification and claims of this application are used to distinguish between similar objects instead of describing a specific order or sequence. It should be understood that data used in such a way are interchangeable in proper circumstances, so that the embodiments of this application can be implemented in an order other than the order illustrated or described herein. Objects classified by "first", "second", and the like are usually of a same type, and the quantity of objects is not limited. For example, there may be one or more first objects. In addition, in this specification and the claims, "and/or" represents at least one of connected objects, and a character "/" generally represents an "or" relationship between associated objects.

With reference to FIG. 1 to FIG. 14, an electronic device provided in the embodiments of this application is described in detail by using specific embodiments and application scenarios of the embodiments.

Figure 2:
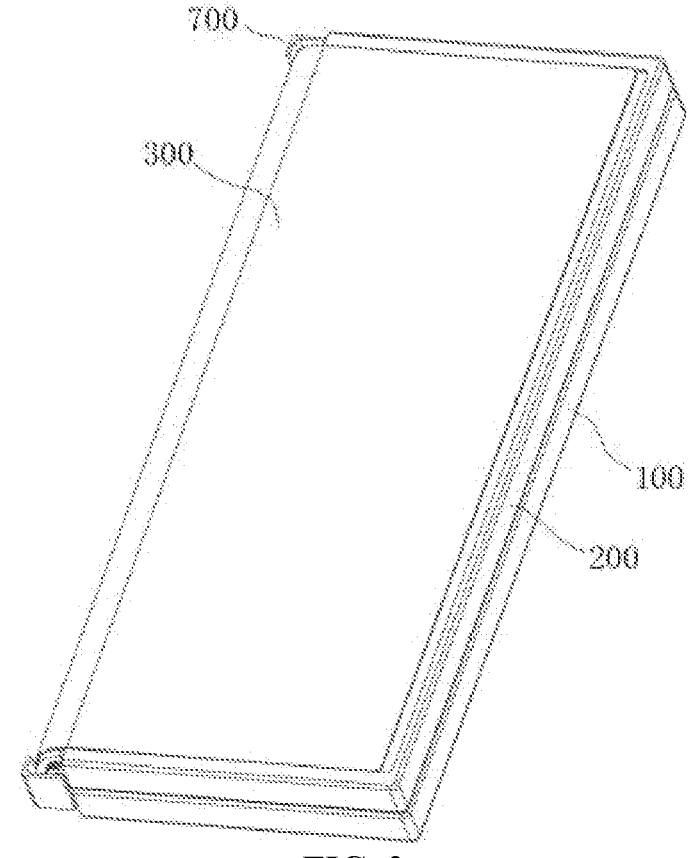
FIG. 2 is a schematic diagram of an electronic device in an unfolded state according to an embodiment of the present invention.
Figure 3:
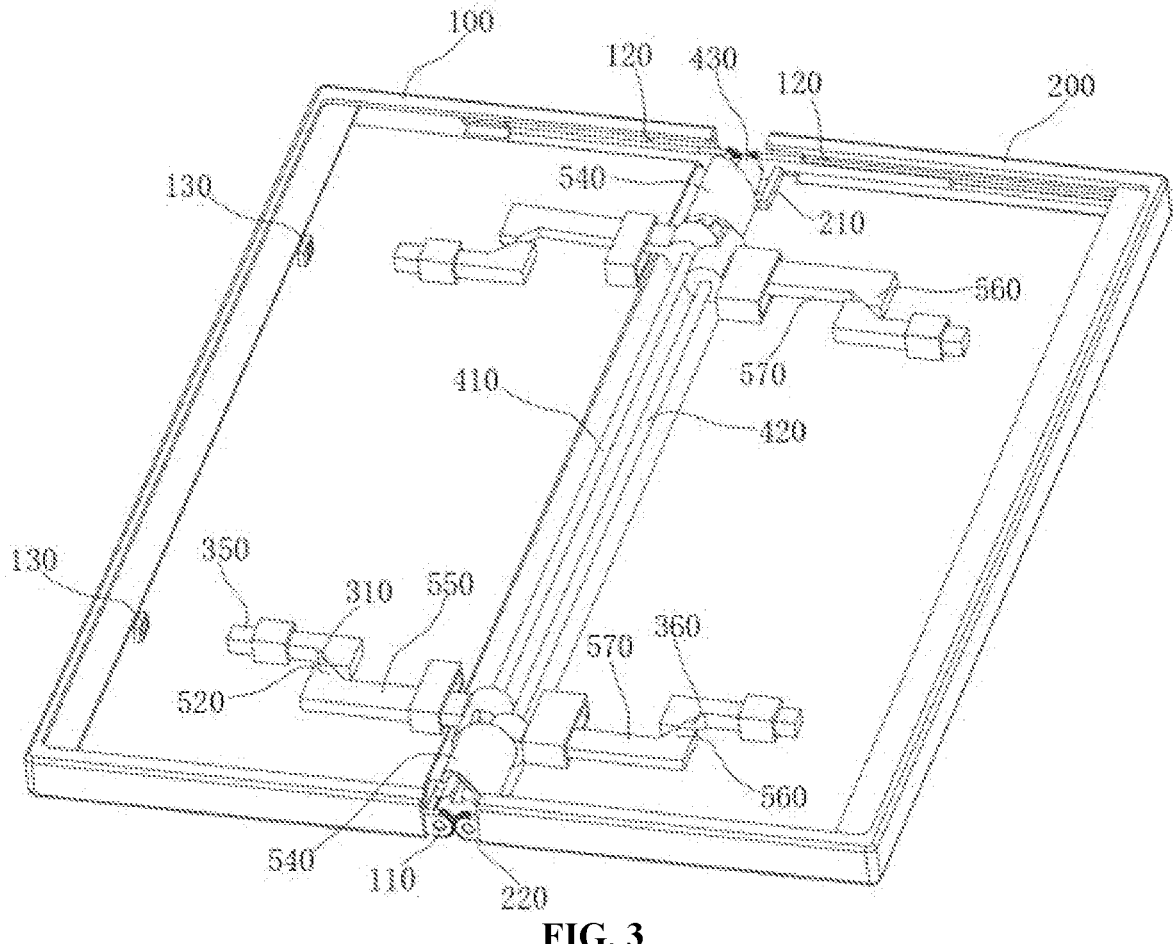
FIG. 3 is a diagram of a transmission principle of an electronic device according to an embodiment of the present invention.

With reference to FIG. 1 to FIG. 3, the electronic device disclosed in the embodiments of this application includes a first housing 100, a second housing 200, a screen assembly 300, a shaft assembly 400, and a transmission member 500. The first housing 100 and the second housing 200 are basic structural members, which can provide a mounting foundation for components of the electronic device.

With reference to FIG. 1 and FIG. 2, the first housing 100 and the second housing 200 are in rotational fit with each other through the shaft assembly 400, so that the electronic device can be folded or unfolded through relative rotation of the first housing 100 and the second housing 200.

Figure 4:
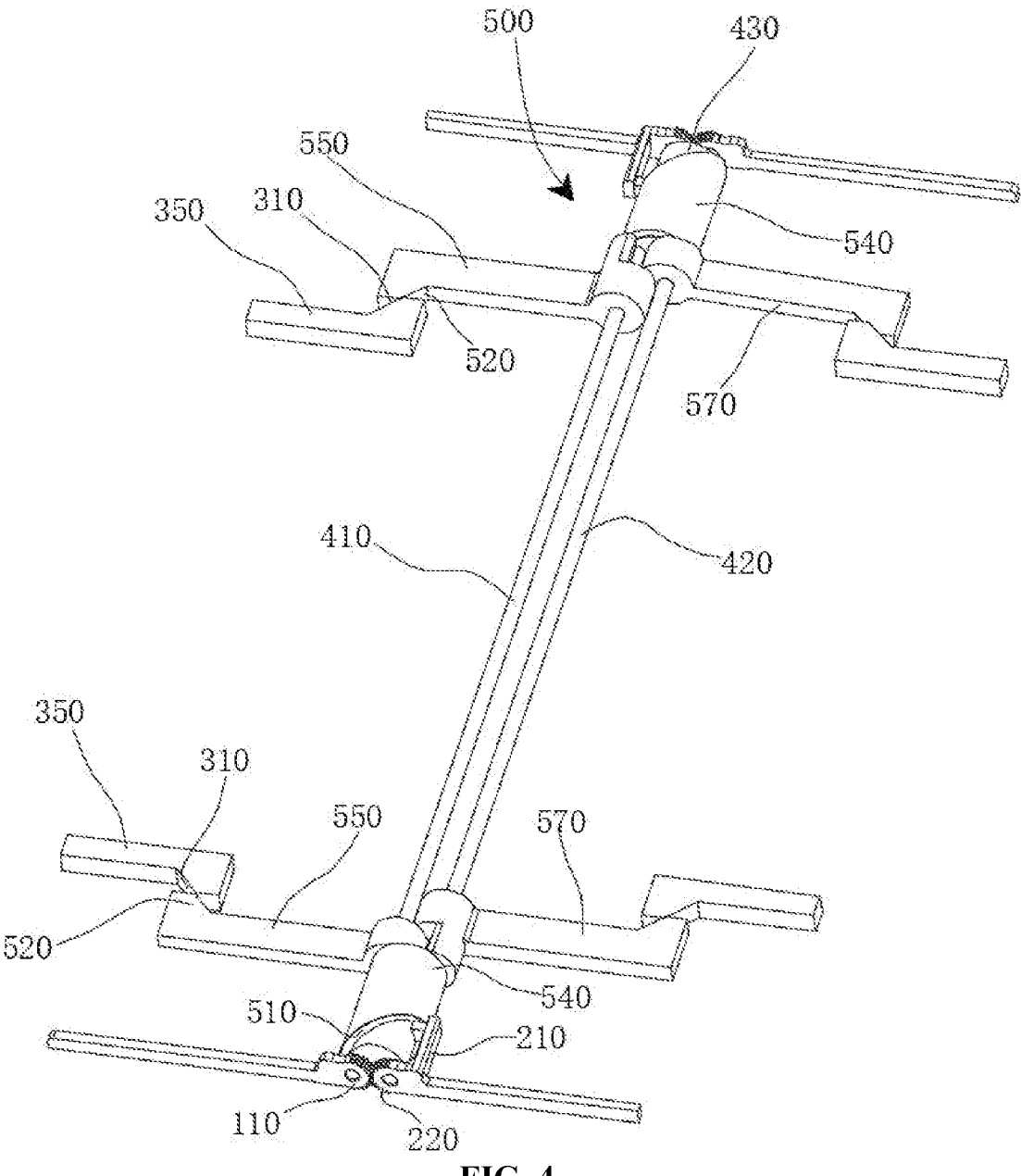
FIG. 4 is a schematic diagram of a transmission structure of an electronic device according to an embodiment of the present invention.

With reference to FIG. 3 and FIG. 4, the transmission member 500 sleeves on the shaft assembly 400. The transmission member 500 is capable of moving in an axial direction of the shaft assembly 400. For example, the transmission member 500 may be in sliding fit with the shaft assembly 400, so that the transmission member 500 is enabled to move in the axial direction of the shaft assembly 400.

With reference to FIG. 3 and FIG. 4, the first housing 100 and/or the second housing 200 each are/is provided with a first pushing portion 210. The transmission member 500 is provided with a first guide surface 510. The first pushing portion 210 is abutted on the first guide surface 510. Optionally, the first pushing portion 210 is in sliding fit with the first guide surface 510, so that the first pushing portion 210 is enabled to slide along the first guide surface 510. For example, in a process of folding the first housing 100 and the second housing 200, the first housing 100 and/or the second housing 200 drive/drives the first pushing portion 210 to slide along the first guide surface 510, thereby pushing the transmission member 500 to move in an axial direction of the first rotating shaft 410.

Figure 9:
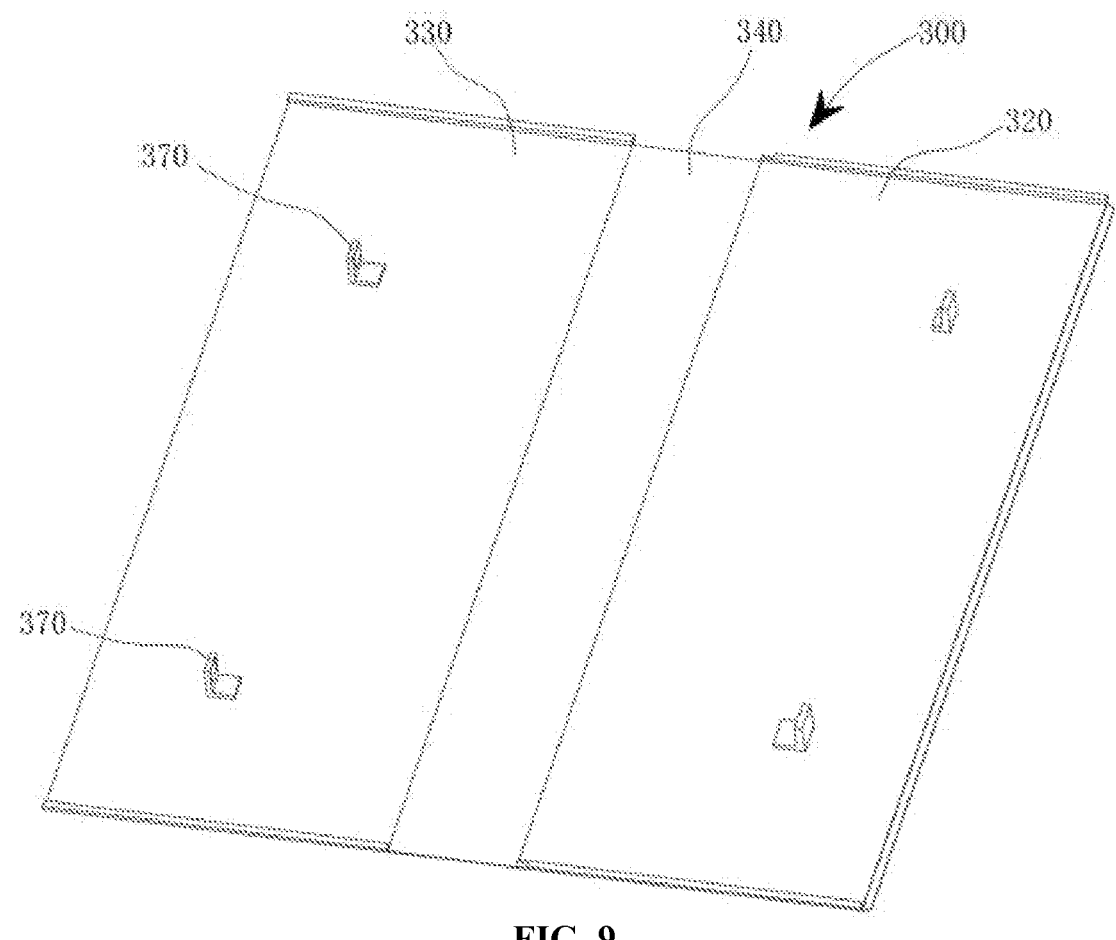
FIG. 9 is a schematic diagram of a screen assembly according to an embodiment of the present invention.

With reference to FIG. 9, the screen assembly 300 includes a first section and a second section. The first section is connected to the second section. For example, the first section of the screen assembly 300 is disposed in the first housing 100; and the second section of the screen assembly 300 is disposed in the second housing 200. For example, the first housing 100 may rotate relative to the second housing 200 between a first position and a second position. In a case that the first housing 100 is at the first position relative to the second housing 200, display surfaces of the screen assembly 300 are in a same plane, that is, the electronic device is unfolded. In a case that the first housing 100 is at the second position relative to the second housing 200, the side of the first housing 100 away from the screen assembly 300 is superposed on the side of the second housing 200 away from the screen assembly 300, that is, the electronic device is folded outwards.

In an optional embodiment, the first section of the screen assembly 300 is in sliding fit with the first housing 100, so that the first section of the screen assembly 300 is enabled to slide along the first housing 100. With reference to FIG. 3 to FIG. 8, the transmission member 500 is connected to the first section of the screen assembly 300, so that the transmission member 500 is enabled to drive the first section of the screen assembly 300 to move along the first housing 100. For example, one of the transmission member 500 and the first section of the screen assembly 300 is provided with a second pushing portion 520. The other one of the transmission member 500 and the first section of the screen assembly 300 is provided with a second guide surface 310. The second guide surface 310 is disposed aslant relative to the axial direction of the shaft assembly 400. The second pushing portion 520 is abutted on the second guide surface 310. For example, the second pushing portion 520 is in sliding fit with the second guide surface 310, so that the second pushing portion 520 is enabled to slide along the second guide surface 310. For example, in a case that the first housing 100 rotates relative to the second housing 200 towards a side provided with the screen assembly 300, the first housing 100 and the second housing 200 slide along the first guide surface 510 through the first pushing portion 210, and push the transmission member 500 to slide in the axial direction of the shaft assembly 400. The transmission member 500 slides along the second guide surface 310 through the second pushing portion 520, and drives the first section of the screen assembly 300 to move towards the second section of the screen assembly 300.

It should be noted that, in this specification of this application, that the electronic device is folded outwards means that after the electronic device is folded, the screen assembly 300 is disposed on sides of the first housing 100 and the second housing 200 that are close to an outer surface. According to the electronic device in the foregoing embodiment, in a process of folding the electronic device outwards, the transmission member 500 may drive the first section of the screen assembly 300 to move towards the second section of the screen assembly 300, to prevent the screen assembly 300 from being stretched in the process of folding the electronic device outwards. Therefore, the following problem can be resolved: The screen assembly 300 is damaged due to stretching that easily occurs in the process of folding the electronic device outwards.

Figures 5, 6:
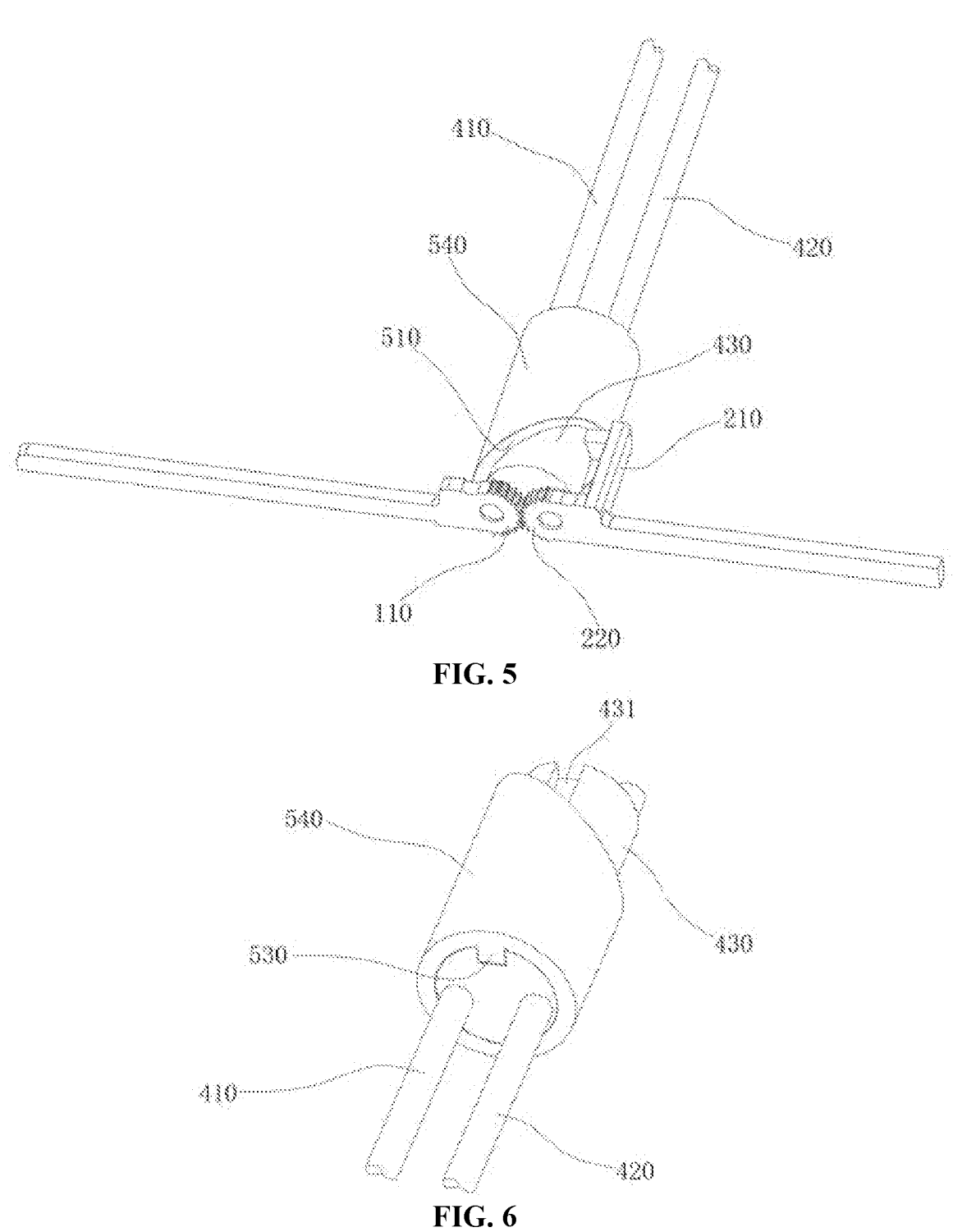
FIG. 5 is a schematic diagram of transmission between a first guide surface and a first pushing portion according to an embodiment of the present invention.
FIG. 6 is a schematic diagram of assembly between a transmission member and a middle shaft according to an embodiment of the present invention.

With reference to FIG. 3 to FIG. 5, the first guide surface 510 may be disposed around the shaft assembly 400; and the first guide surface 510 is inclined to the axial direction of the shaft assembly 400. For example, the first guide surface 510 may be a spirally inclined surface around the shaft assembly 400. Optionally, the first guide surface 510 is disposed at an end of the side of the transmission member 500 close to the first pushing portion 210. In another optional embodiment, a circumferential side wall of the transmission member 500 is provided with a spiral groove or protrusion, to form the first guide surface 510 through an inner side wall of the spiral groove or a side wall of the protrusion.

Figure 7:
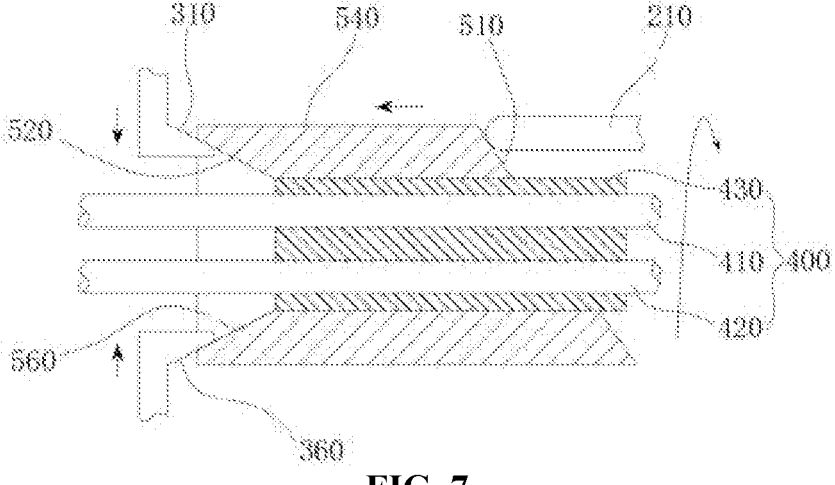
FIG. 7 is a schematic diagram of transmission between a transmission member and a screen assembly according to a first embodiment of the present invention.

With reference to FIG. 7, in an optional embodiment, the transmission member 500 sleeves on the shaft assembly 400. An end of the transmission member 500 is provided with a second pushing portion 520. The first section of the screen assembly 300 may be provided with a second guide surface 310. For example, an end of the transmission member 500 is provided with a circular hole or a circular groove. The screen assembly 300 is provided with a protrusion structure that protrudes towards the circular hole or the circular groove of the transmission member 500. The second guide surface 310 is disposed on the protrusion structure, so that the end of the transmission member 500 close to the protrusion structure is enabled to slide along the second guide surface 310. In a process of folding the electronic device, the first pushing portion 210 rotates along with the first housing 100 and/or the second housing 200, so that the transmission member 500 is pushed to move towards the second guide surface 310. Therefore, the second guide surface 310 is enabled, under the action of the transmission member 500, to move towards the first rotating shaft 410, thereby driving the first section of the screen assembly 300 to move towards the second section of the screen assembly 300.

In another optional embodiment, the second guide surface 310 is a taper hole or taper groove disposed in an end of the transmission member 500. An inner side wall of the taper hole or taper groove is disposed aslant relative to the shaft assembly 400. The second pushing portion 520 is a protrusion structure disposed on the screen assembly 300. The protrusion structure protrudes towards the taper hole or taper groove. The protrusion structure is at least partially disposed in the taper hole or taper groove, so that the second pushing portion 520 is enabled to be abutted on the inner side wall of the taper hole or taper groove. In a process in which the transmission member 500 slides in the axial direction of the shaft assembly 400, the second pushing portion may slide along the inner side wall of the taper hole or taper groove in the axial direction of the shaft assembly 400, thereby driving the first section of the screen assembly 300 to move towards the second section of the screen assembly 300.

In an optional embodiment, the transmission member 500 includes a sleeve 540 and a first transmission block 550. For example, the sleeve 540 sleeves on the shaft assembly 400; and the first guide surface 510 is disposed in the sleeve 540. A first end of the first transmission block 550 is connected to the transmission member 500. The first transmission block 550 is capable of rotating around the shaft assembly 400 relative to the sleeve 540. A second end of the first transmission block 550 is connected to the first section of the screen assembly 300 through the second pushing portion 520 and the second guide surface 310. In a process of folding the electronic device, that is, in a case that the first housing 100 rotates relative to the second housing 200 towards the side away from the screen assembly 300, the first pushing portion 210 drives the sleeve 540 to move in the axial direction of the shaft assembly 400; and the sleeve 540 drives, through the first transmission block 550, the first section of the screen assembly 300 to move relative to the first housing 100. Therefore, in a process of folding the electronic device outwards, the first section of the screen assembly 300 slides relative to the first housing 100, to resolve the following problem: The screen assembly 300 is damaged due to excessive stretching at a bendable portion of the electronic device.

In the foregoing embodiment, the first transmission block 550 may convert movement of the sleeve 540 in the axial direction of the shaft assembly 400 into movement of the first section of the screen assembly 300 towards the second section of the screen assembly 300, so that the screen assembly 300 can be prevented from being stretched in a process of folding the electronic device. In addition, as the first transmission block 550 is provided, displacement of the first section of the screen assembly 300 relative to the first housing 100 can be prevented from being affected by the diameter of the sleeve 540, so that the diameter of the first transmission block 550 of the electronic device can be reduced as required. This facilitates thickness reduction of the electronic device.

With reference to FIG. 3 to FIG. 8, the shaft assembly 400 may include a first rotating shaft 410 and a second rotating shaft 420. The first rotating shaft 410 and the second rotating shaft 420 may be disposed parallel to each other. The first rotating shaft 410 is disposed on the first housing 100. The first housing 100 is in rotational fit with the transmission member 500 through the first rotating shaft 410. The second rotating shaft 420 is disposed on the second housing 200. The second housing 200 is in rotational fit with the transmission member 500 through the second rotating shaft 420. For example, the transmission member 500 may be provided with two parallel mounting holes. The first rotating shaft 410 and the second rotating shaft 420 may be in clearance fit with the two mounting holes of the transmission member 500 respectively, so that the first rotating shaft 410 and the second rotating shaft 420 are enabled to rotate relative to the transmission member 500 separately, and the transmission member 500 is enabled to slide along the first rotating shaft 410 and the second rotating shaft 420. In this solution, the first rotating shaft 410 and the second rotating shaft 420 are parallel to each other and spaced apart, so that the first housing 100 and the second housing 200 respectively rotate around two parallel axes. Therefore, a space by which the first housing 100 and the second housing 200 avoid each other is enlarged, to prevent the first housing 100 and the second housing 200 from interfering with each other in a process of unfolding or folding the electronic device.

In an optional embodiment, the distance between the first rotating shaft 410 and the second rotating shaft 420 is a first distance. The distance from the first rotating shaft 410 to the side of the first housing 100 away from the first section of the screen assembly 300 is a second distance. The distance from the second rotating shaft 420 to the side of the second housing 200 away from the second section of the screen assembly 300 is a third distance. The first distance is not less than the sum of the second distance and the third distance. Therefore, in a case that the electronic device is folded outwards, the first housing 100 and the second housing 200 can be attached to each other better, to reduce the folded thickness of the electronic device, and improve the comfort level of the electronic device.

With reference to FIG. 3 and FIG. 4, the shaft assembly 400 may further include a middle shaft 430. The middle shaft 430 has a first mounting hole and a second mounting hole. The middle shaft 430 is in rotational fit with the first rotating shaft 410 through the first mounting hole. The middle shaft 430 is in rotational fit with the second rotating shaft 420 through the second mounting hole. The transmission member 500 sleeves on the middle shaft 430. The transmission member 500 is in sliding fit with the middle shaft 430. The transmission member 500 is in rotational fit with the first rotating shaft 410 and the second rotating shaft 420 through the middle shaft 430, so that resistance to movement of the transmission member 500 along the axis of the first rotating shaft 410 can be reduced.

It should be noted that, in a process in which the first housing 100 and the second housing 200 rotate relative to each other, the first rotating shaft 410 and the second rotating shaft 420 are under action forces of the first housing 100 and the second housing 200, so that the first rotating shaft 410 and the second rotating shaft 420 tend to move away from each other or towards each other. In a case that the transmission member 500 is provided with a first mounting hole and a second mounting hole that are respectively used for mounting of the first rotating shaft 410 and the second rotating shaft 420, due to action of the first housing 100 and the second housing 200, an extrusion force between the first rotating shaft 410 and a hole wall of the first mounting hole is increased, and an extrusion force between the second rotating shaft 420 and a hole wall of the second mounting hole is increased. This further increases friction between the first rotating shaft 410 and the hole wall of the first mounting hole, and increases friction between the second rotating shaft 420 and the interior of the second mounting hole. Therefore, the transmission member 500 is directly provided with the first mounting hole assembled with the first rotating shaft 410 and the second mounting hole assembled with the second rotating shaft 420, making the friction between the first rotating shaft 410 and the first mounting hole not only prevent the first rotating shaft 410 from rotating relative to the transmission member 500, but also prevent the transmission member 500 from moving in the axial direction of the first rotating shaft 410. Similarly, the friction between the second rotating shaft 420 and the second mounting hole not only prevents the second rotating shaft 420 from rotating relative to the transmission member 500, but also prevents the transmission member 500 from moving in the axial direction of the second rotating shaft 420. In the foregoing embodiment, the middle shaft 430 is provided, and the first mounting hole and the second mounting hole are disposed in the middle shaft 430, so that the transmission member 500 is in sliding fit with the middle shaft 430. This can prevent the first rotating shaft 410 and the second rotating shaft 420 from being stressed, which affects resistance to sliding of the transmission member 500 in the axial direction of the shaft assembly 400. With reference to FIG. 3 to FIG. 5, in a case that the friction between the first rotating shaft 410 and the first mounting hole increases, only resistance to rotation of the first rotating shaft 410 relative to the transmission member 500 is increased, and resistance to movement of the transmission member 500 along the middle shaft 430 is not increased; and in a case that the friction between the second rotating shaft 420 and the second mounting hole increases, only resistance to rotation of the second rotating shaft 420 relative to the transmission member 500 is increased, and resistance to movement of the transmission member 500 along the middle shaft 430 is not increased. Therefore, as the middle shaft 430 is provided in the foregoing embodiment, resistance to movement of the transmission member 500 in the axial direction of the shaft assembly 400 can be reduced.

With reference to FIG. 5, the first guide surface 510 is disposed around the middle shaft 430; and the first guide surface 510 is inclined to an axial direction of the middle shaft 430. For example, the transmission member 500 may be provided with a guide rail or guide groove, thereby forming, through the guide rail or guide groove, the first guide surface 510 disposed around the middle shaft 430. In a process of folding the electronic device, the first pushing portion 210 may slide along the first guide surface 510, thereby pushing the transmission member 500 to move in the axial direction of the first rotating shaft 410. With reference to FIG. 5, the first guide surface 510 may be a spiral guide surface disposed at the periphery of the transmission member 500. For example, the first pushing portion

210 may be a convex block or convex column disposed on the first housing 100 and/or the second housing 200. For example, the end of the first pushing portion 210 in contact with the first guide surface 510 is provided as an arc-shaped surface, to reduce resistance to sliding of the first pushing portion 210 along the first guide surface 510.

Figure 8:
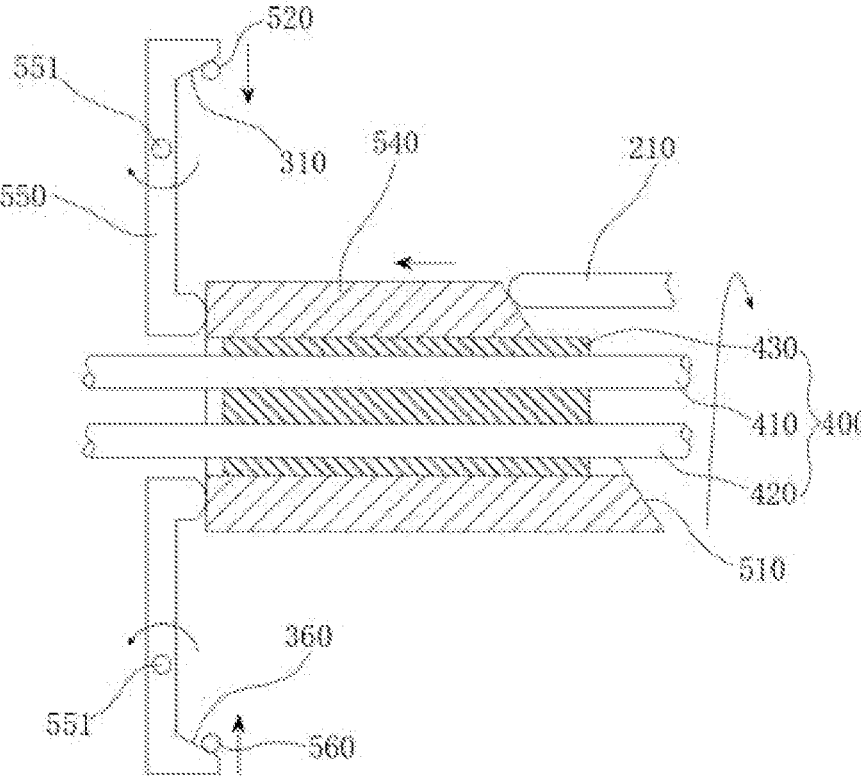
FIG. 8 is a schematic diagram of transmission between a transmission member and a screen assembly according to a second embodiment of the present invention.

With reference to FIG. 3, FIG. 7, and FIG. 8, one of the middle shaft 430 and the transmission member 500 is provided with a limiting groove 431, and the limiting groove 431 is disposed in the axial direction of the first rotating shaft 410. The other one of the middle shaft 430 and the transmission member 500 is provided with a limiting protrusion 530, the limiting protrusion 530 is at least partially embedded in the limiting groove 431, and the limiting protrusion 530 is in sliding fit with the limiting groove 431. Due to the limiting groove 431 and the limiting protrusion 530, the transmission member 500 is enabled to slide along the middle shaft 430, and the transmission member 500 and the middle shaft 430 can be prevented from rotating relative to each other. As rotation of the transmission member 500 relative to the middle shaft 430 is limited, the following can be ensured: The transmission member 500 can move in the axial direction of the first rotating shaft 410 under the action of the first pushing portion 210.

In another optional embodiment, the middle shaft 430 may be provided as a square shaft, and the transmission member 500 is provided with a square hole, so that the transmission member 500 can be in sliding fit with the middle shaft 430 through the square hole, and a degree of freedom of rotation of the transmission member 500 relative to the middle shaft 430 is limited. There are a plurality of manners of limiting rotation of the transmission member 500 relative to the middle shaft 430. For example, the middle shaft 430 is provided as a hexagonal prism, and the transmission member 500 is provided with a hexagonal hole that is in sliding fit with the middle shaft 430. Therefore, a structure that limits rotation of the middle shaft 430 and the transmission member 500 is not specifically limited in this application.

With reference to FIG. 3, in an optional embodiment, the first transmission block 550 is in sliding fit with the first housing 100, the first end of the first transmission block 550 sleeves on the first rotating shaft 410, the first transmission block 550 is in sliding fit with the first rotating shaft 410, and in a process of folding the first housing 100 and the second housing 200, the first housing 100 drives the first transmission block 550 to rotate relative to the first rotating shaft 410, and the sleeve 540 drives the first transmission block 550 to move in the axial direction of the first rotating shaft 410. For example, the first housing 100 is provided with a sliding groove, and the first transmission block 550 is at least partially disposed in the sliding groove, so that the first transmission block 550 is enabled to slide along the sliding groove. In this embodiment, the first transmission block 550 slides along the first housing 100, so that the first transmission block 550 interacts with the first section of the screen assembly 300, thereby driving the first section of the screen assembly 300 to move towards the second section of the screen assembly 300. For example, the first transmission block 550 may be in abutted connection with and/or in rotational fit with the sleeve 540.

With reference to FIG. 7, in an optional embodiment, the first transmission block 550 is provided with a rotating portion 551, the rotating portion 551 is in rotational fit with the first housing 100, and in a process of folding the first housing 100 and the second housing 200, the sleeve 540 drives the first transmission block 550 to rotate relative to the first housing 100. For example, the distance between the rotating portion 551 and the joint of the first transmission block 550 and the sleeve 540 is a first moment arm, the distance between the rotating portion 551 and the joint of the rotating portion 551 and the first section of the screen assembly 300 is a second moment arm, and the first moment arm is greater than the second moment arm, so that resistance in a process of folding the electronic device is reduced. For example, the rotating portion 551 is disposed between the first end of the first transmission block 550 and the second end of the first transmission block 550.

With reference to FIG. 3, FIG. 9, FIG. 12, and FIG. 13, in an optional embodiment, the first section of the screen assembly 300 is provided with a guide block 350, and the guide block 350 is disposed on the side of the screen assembly 300 away from a display surface. For example, the second guide surface 310 may be disposed on the guide block 350, and the second pushing portion 520 may be disposed on the first transmission block 550, so that the guide block 350 can be connected to the first transmission block 550 through the second guide surface 310 and the second pushing portion 520, and the first transmission block 550 is enabled to drive the guide block 350 and the first section of the screen assembly 300 to move towards the second section of the screen assembly 300.

Figure 12:
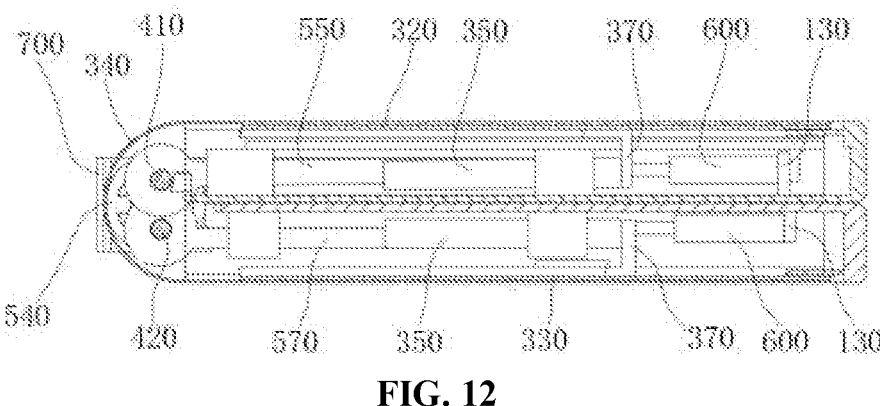
FIG. 12 is a sectional view of an electronic device in a folded state according to an embodiment of the present invention.
Figure 13:
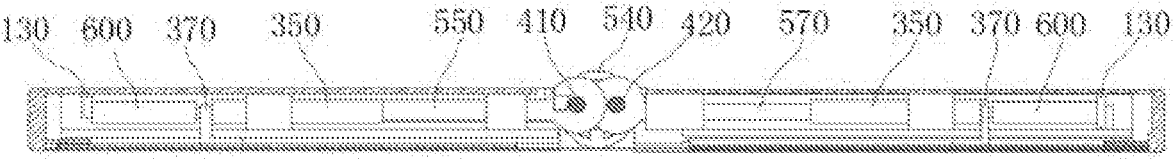
FIG. 13 is a sectional view of an electronic device in an unfolded state according to an embodiment of the present invention.

With reference to FIG. 12 and FIG. 13, the screen assembly 300 further includes a first fixing block 370. The first fixing block 370 is fixedly disposed on the side of the first section of the screen assembly 300 away from the display surface. Further, the guide block 350 may be fixedly connected to the screen assembly 300 through the first fixing block 370. Certainly, the guide block 350 may alternatively be fixed to the side of the first section of the screen assembly 300 away from the display surface via sticking.

With reference to FIG. 1 to FIG. 3, the second section of the screen assembly 300 is in sliding fit with the second housing 200. One of the transmission member 500 and the first section of the screen assembly 300 is provided with a third pushing portion 560. The other one of the transmission member 500 and the first section of the screen assembly 300 is provided with a third guide surface 360. The third guide surface 360 is disposed aslant relative to the axial direction of the shaft assembly 400. The third pushing portion 560 is in sliding fit with the third guide surface 360. In a process of folding the first housing 100 and the second housing 200, the transmission member 500 drives the second section of the screen assembly 300 to move towards the first section of the screen assembly 300. For example, the third guide surface 360 may be disposed on the transmission member 500 or the screen assembly 300, so that in a process of sliding along the third guide surface 360, the third pushing portion 560 can drive the second section of the screen assembly 300 to move towards the first section of the screen assembly 300.

For example, the transmission member 500 further includes a second transmission block 570. A first end of the second transmission block 570 is connected to the transmission member 500. The second transmission block 570 is capable of rotating around the shaft assembly 400 relative to the sleeve 540. A second end of the second transmission block 570 is connected to the second section of the screen assembly 300 through the third pushing portion 560 and the third guide surface 360. In a process of folding the electronic device, that is, in a case that the first housing 100 rotates relative to the second housing 200 towards the side away from the screen assembly 300, the first pushing portion 210 drives the sleeve 540 to move in the axial direction of the shaft assembly 400; and the sleeve 540 drives, through the second transmission block 570, the first section of the screen assembly 300 to move relative to the first housing 100. Therefore, in a process of folding the electronic device outwards, the first section of the screen assembly 300 slides relative to the first housing 100.

It should be noted that, in this application, a structure connecting the transmission member 500 with the second section of the screen assembly 300 may be the same as a structure connecting the transmission member 500 with the first section of the screen assembly 300. Therefore, the structure connecting the transmission member 500 with the second section of the screen assembly 300 is not further described in the embodiments of this application.

With reference to FIG. 3, there may be two transmission members 500. The two transmission members 500 may be distributed at two ends of the shaft assembly 400 symmetrically, so that the screen assembly 300 is stressed uniformly, and thus the following problem is avoided: A jam occurs when the screen assembly 300 slides along the first housing 100 and/or the second housing 200. Certainly, there may alternatively be a plurality of transmission members 500. The plurality of transmission members 500 may be uniformly distributed on the shaft assembly 400 in the axial direction of the shaft assembly 400. Therefore, a specific quantity of transmission members 500 is not limited in this application.

Figures 10, 11:
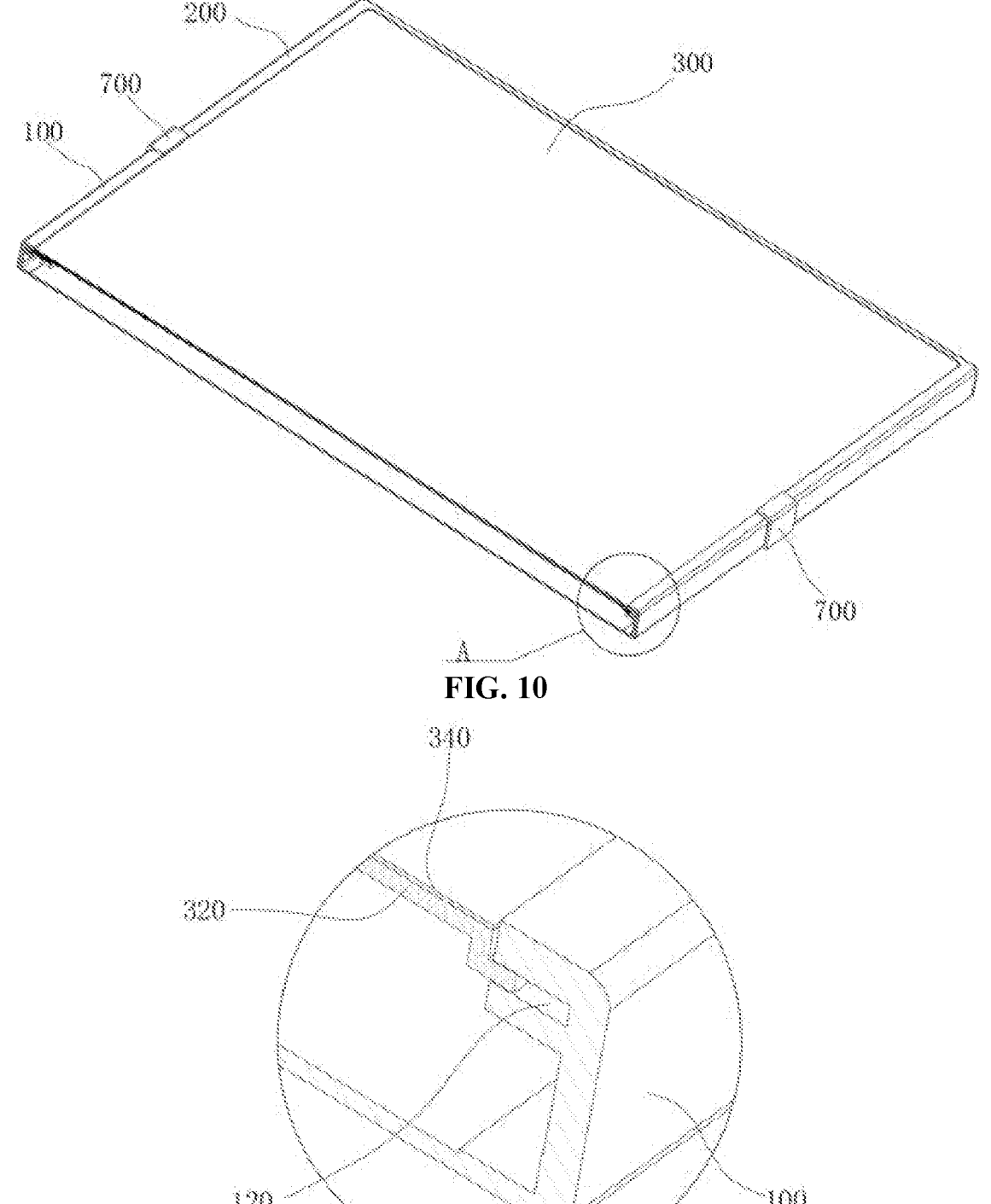
FIG. 10 is a schematic sectional view according to an embodiment of the present invention.
FIG. 11 is a partially enlarged view of A in FIG. 10.

With reference to FIG. 9 to FIG. 11, the screen assembly 300 further includes a first support plate 320, a second support plate 330, and a flexible screen 340. A first section of the flexible screen 340 is connected to the first support plate 320. A second section of the flexible screen 340 is connected to the second support plate 330. The first support plate 320 is in sliding fit with the first housing 100. The first support plate 320 is capable of moving towards or away from the shaft assembly 400 along the first housing 100. The second support plate 330 is in sliding fit with the second housing 200. The second support plate 330 is capable of moving towards or away from the shaft assembly 400 along the second housing 200. For example, the first support plate 320 and the second support plate 330 may be made of a hard material. The first section of the flexible screen 340 may be fixedly stuck to the first support plate 320. The second section of the flexible screen 340 may be fixedly stuck to the second support plate 330. It should be noted that there are many types of hard materials, such as a stainless steel plate, an aluminum alloy plate, an acrylic plate, and the like. Therefore, a specific type of the material of the first support plate 320 and the second support plate 330 is not limited in this embodiment.

With reference to FIG. 10 and FIG. 11, the first housing 100 and the second housing 200 each are provided with a sliding groove 120. The first section of the screen assembly 300 is at least partially disposed in the sliding groove 120 of the first housing 100, so that the screen assembly 300 can be in sliding fit with the first housing. Similarly, the second section of the screen assembly 300 is at least partially disposed in the sliding groove 120 of the second housing 200, so that the second section of the screen assembly 300 can be in sliding fit with the second housing 200. For example, the dimension of the first support plate 320 in the axial direction of the shaft assembly 400 is greater than the dimension of the flexible screen 340 in the axial direction of the shaft assembly 400, so that the two sides of the first support plate 320 in the axial direction of the shaft assembly 400 may protrude from the flexible screen 340. Therefore, the first section of the screen assembly 300 can be in sliding fit with the first housing 100 by at least partially disposing, in the sliding groove 120, the part of the first support plate 320 protruding from the flexible screen 340. Similarly, the dimension of the second support plate 330 in the axial direction of the shaft assembly 400 is greater than the dimension of the flexible screen 340 in the axial direction of the shaft assembly 400, so that the two sides of the second support plate 330 in the axial direction of the shaft assembly 400 may protrude from the flexible screen 340. Therefore, the first section of the screen assembly 300 can be in sliding fit with the second housing 200 by at least partially disposing, in the sliding groove 120, the part of the second support plate 330 protruding from the flexible screen 340.

In an optional embodiment, the electronic device further includes an elastic member 600, the elastic member 600 is disposed in the first housing 100, the elastic member 600 is connected to the first section of the screen assembly 300, and in a process of unfolding the electronic device, the elastic member 600 is capable of driving the first section of the screen assembly 300 to move away from the second section of the screen assembly 300; and/or the elastic member 600 is disposed in the second housing 200, the elastic member 600 is connected to the second section of the screen assembly 300, and in a process of unfolding the electronic device, the elastic member 600 is capable of driving the second section of the screen assembly 300 to move away from the first section of the screen assembly 300. For example, the elastic member 600 may be a spring. For example, in a case that the electronic device is folded, the elastic member is stretched or compressed, so that an elastic force generated by the elastic member can drive the first section of the screen assembly 300 to move away from the second section of the screen assembly 300; and/or in a case that the electronic device is folded, the elastic force generated by the elastic member can drive the second section of the screen assembly 300 to move away from the first section of the screen assembly 300. There are a plurality of types of elastic members. For example, the elastic member may be a rubber band, a spring 620, a spring plate, or the like. Therefore, a specific type of the elastic member is not limited in this embodiment.

Figure 14:
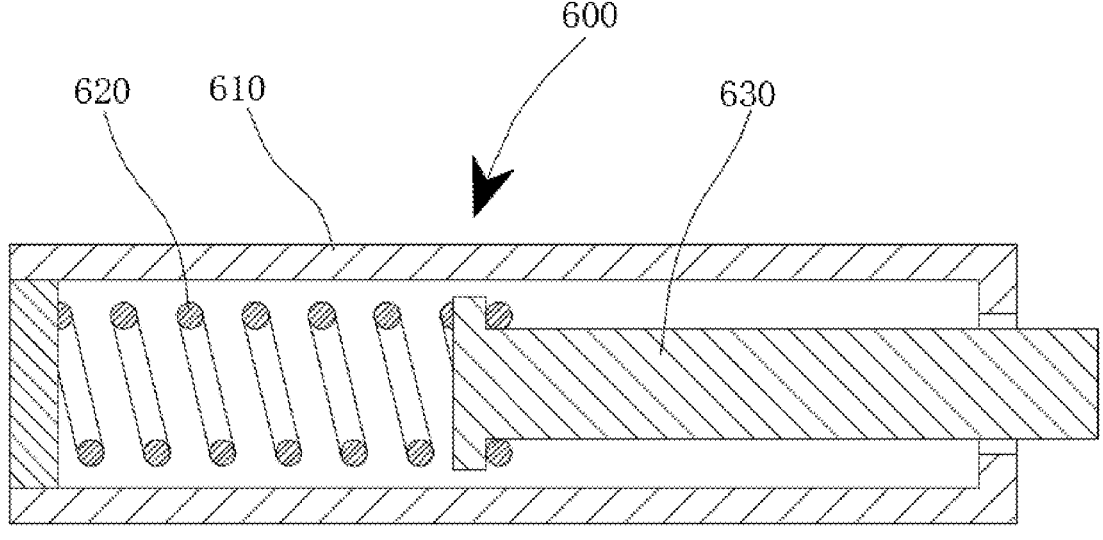
FIG. 14 is a sectional view of an elastic member according to an embodiment of the present invention.

With reference to FIG. 14, in an optional embodiment, the elastic member 600 includes an external housing 610, a spring 620, and a push rod 630. The external housing 610 sleeves on the push rod 630. The push rod 630 is in sliding fit with the external housing 610. For example, the spring 620 is disposed in the external housing 610, a first end of the spring 620 is connected to the external housing 610, and a second end of the spring 620 is connected to the push rod 630, so that the spring 620 is capable of driving the push rod 630 to slide along the external housing 610. For example, one of the push rod 630 and the external housing 610 is connected to the first housing 100, and the other one of the push rod 630 and the external housing 610 is connected to the first section of the screen assembly 300.

With reference to FIG. 12 to FIG. 14, in an optional embodiment, the external housing 610 may be fixed to the first housing 100 and/or the second housing 200 through the second fixing block 130. The end of the push rod 630 away from the spring 620 may be fixed onto the first support plate 320 and/or the second support plate 330 through the first fixing block 370. Therefore, in a process of unfolding the electronic device, the spring 620 can act on the push rod 630 and drive the first section and the second section of the screen assembly 300 to move away from each other.

With reference to FIG. 1 to FIG. 4, the first housing 100 is provided with a first teeth structure 110, the second housing 200 is provided with a second teeth structure 220, the first teeth structure 110 is meshed with the second teeth structure 220, and in a case that the first housing 100 rotates, the first housing 100 drives, through the first teeth structure 110 and the second teeth structure 220, the second housing 200 to rotate. As the first teeth structure 110 and the second teeth structure 220 are provided, the first housing 100 and the second housing 200 can rotate synchronously, thereby improving user experience. Optionally, the first teeth structure 110 may be an arc-shaped teeth section disposed on the first housing 100, and the second teeth structure 220 may be an arc-shaped teeth section disposed on the second housing 200. Certainly, the first teeth structure 110 may alternatively be a gear that is fixedly disposed on the first housing, and the second teeth structure may alternatively be a gear that is fixedly disposed on the second housing 200.

In an optional embodiment, the electronic device includes a rotation limiting member 700. The rotation limiting member 700 is disposed on the first rotating shaft 410 and/or the second rotating shaft 420. Inward folding of the electronic device is limited through the rotation limiting member 700. For example, the rotation limiting member 700 has a fixing portion and a limiting portion. The fixing portion is perpendicular to the limiting portion. The fixing portion is fixed on the first rotating shaft 410 and/or the second rotating shaft 420. The limiting portion is bent towards the sides of the first housing 100 and the second housing 200 close to the display surface of the screen assembly 300. In addition, in a case that the electronic device is unfolded, the limiting portion is abutted on the sides of the first housing 100 and the second housing 200 close to the display surface of the screen assembly 300, thereby preventing the electronic device from being folded inwards.

In an optional embodiment, the electronic device further includes a damping mechanism. Resistance to rotation of the first housing 100 and the second housing 200 can be increased through the damping mechanism, so that rotation of the first housing 100 and the second housing 200 may be stopped at any angle. It should be noted that there are many types of damping mechanisms, such as a liquid damper, a gas damper, and an electromagnetic damper. Therefore, a specific type of the damping mechanism is not limited in this embodiment.

It should be noted that, in this specification, the term "include", "comprise", or any other variant thereof is intended to cover a non-exclusive inclusion, so that a process, a method, an article, or an apparatus that includes a list of elements not only includes those elements but also includes other elements which are not expressly listed, or further includes elements inherent to such process, method, article, or apparatus. In absence of more constraints, an element preceded by "includes a . . . " does not preclude the existence of other identical elements in the process, method, article, or apparatus that includes the element. In addition, it should be noted that the scope of the method and the apparatus in the embodiments of this application is not limited to performing functions in an illustrated or discussed sequence, and may further include performing functions in a basically simultaneous manner or in a reverse sequence according to the functions concerned. For example, the described method may be performed in an order different from that described, and the steps may be added, omitted, or combined. In addition, features described with reference to some examples may be combined in other examples.

The embodiments of this application are described above with reference to the accompanying drawings, but this application is not limited to the above specific implementations, and the above specific implementations are only illustrative and not restrictive. Under the enlightenment of this application, those of ordinary skill in the art can make many forms without departing from the purpose of this application and the protection scope of the claims, all of which fall within the protection of this application.

The invention claimed is:

1. An electronic device, comprising a first housing, a second housing, a screen assembly, a shaft assembly, and a transmission member, wherein the first housing and the second housing are in rotational fit with each other through the shaft assembly, the transmission member sleeves on the shaft assembly, and the transmission member is capable of moving in an axial direction of the shaft assembly;

the first housing and/or the second housing each are/is provided with a first pushing portion, the transmission member is provided with a first guide surface, and the first pushing portion is abutted on the first guide surface;

a first section of the screen assembly is in sliding fit with the first housing, a second section of the screen assembly is disposed in the second housing, one of the transmission member and the first section of the screen assembly is provided with a second pushing portion, the other one of the transmission member and the first section of the screen assembly is provided with a second guide surface, the second guide surface is disposed aslant relative to the axial direction of the shaft assembly, and the second pushing portion is abutted on the second guide surface; and in a case that the first housing rotates relative to the second housing towards the side away from the screen assembly, the first pushing portion slides along the first guide surface, and pushes the transmission member to slide in the axial direction of the shaft assembly; and the transmission member slides along the second guide surface through the second pushing portion, and drives the first section of the screen assembly to move towards the second section of the screen assembly.

2. The electronic device according to claim 1, wherein the first guide surface is disposed around the shaft assembly, and the first guide surface is inclined to the axial direction of the shaft assembly.

3. The electronic device according to claim 1, wherein the shaft assembly comprises a first rotating shaft and a second rotating shaft, and the first rotating shaft and the second rotating shaft are disposed parallel to each other;

the first rotating shaft is disposed on the first housing, and the first housing is in rotational fit with the transmission member through the first rotating shaft; and the second rotating shaft is disposed on the second housing, and the second housing is in rotational fit with the transmission member through the second rotating shaft.

4. The electronic device according to claim 3, wherein the shaft assembly further comprises a middle shaft, the middle shaft has a first mounting hole and a second mounting hole, the middle shaft is in rotational fit with the first rotating shaft through the first mounting hole, and the middle shaft is in rotational fit with the second rotating shaft through the second mounting hole; and the transmission member sleeves on the middle shaft, and the transmission member is in sliding fit with the middle shaft.

5. The electronic device according to claim 4, wherein one of the middle shaft and the transmission member is provided with a limiting groove, the limiting groove is disposed in the axial direction of the first rotating shaft, the other one of the middle shaft and the transmission member is provided with a limiting protrusion, the limiting protrusion is at least partially embedded in the limiting groove, and the limiting protrusion is in sliding fit with the limiting groove.

6. The electronic device according to claim 3, wherein the transmission member comprises a sleeve and a first transmission block, the sleeve sleeves on the shaft assembly, and the first guide surface is disposed in the sleeve;

a first end of the first transmission block is connected to the sleeve, the first transmission block is capable of rotating around the shaft assembly relative to the sleeve, and a second end of the first transmission block is connected to the first section of the screen assembly through the second pushing portion and the second guide surface; and in a process of folding the electronic device, the first pushing portion drives the sleeve to move in the axial direction of the shaft assembly, and the sleeve drives, through the first transmission block, the first section of the screen assembly to move relative to the first housing.

7. The electronic device according to claim 6, wherein the first transmission block is in sliding fit with the first housing, the first end of the first transmission block sleeves on the first rotating shaft, the first transmission block is in sliding fit with the first rotating shaft, and in a process of folding the first housing and the second housing, the first housing drives the first transmission block to rotate relative to the first rotating shaft, and the sleeve drives the first transmission block to move in the axial direction of the first rotating shaft.

8. The electronic device according to claim 6, wherein the first transmission block is provided with a rotating portion, the rotating portion is in rotational fit with the first housing, and in a process of folding the first housing and the second housing, the sleeve drives the first transmission block to rotate relative to the first housing.

9. The electronic device according to claim 1, wherein the second section of the screen assembly is in sliding fit with the second housing;

one of the transmission member and the first section of the screen assembly is provided with a third pushing portion, the other one of the transmission member and the first section of the screen assembly is provided with a third guide surface, the third guide surface is disposed aslant relative to the axial direction of the shaft assembly, and the third pushing portion is in sliding fit with the third guide surface; and in a process of folding the first housing and the second housing, the transmission member drives the second section of the screen assembly to move towards the first section of the screen assembly.

10. The electronic device according to claim 9, wherein the screen assembly further comprises a first support plate, a second support plate, and a flexible screen, a first section of the flexible screen is connected to the first support plate, and a second section of the flexible screen is connected to the second support plate;

the first support plate is in sliding fit with the first housing, and the first support plate is capable of moving towards or away from the shaft assembly along the first housing; and the second support plate is in sliding fit with the second housing, and the second support plate is capable of moving towards or away from the shaft assembly along the second housing.

11. The electronic device according to claim 9, wherein the electronic device further comprises an elastic member, the elastic member is disposed in the first housing, the elastic member is connected to the first section of the screen assembly, and in a process of unfolding the electronic device, the elastic member is capable of driving the first section of the screen assembly to move away from the second section of the screen assembly; and/or the elastic member is disposed in the second housing, the elastic member is connected to the second section of the screen assembly, and in a process of unfolding the electronic device, the elastic member is capable of driving the second section of the screen assembly to move away from the first section of the screen assembly.

12. The electronic device according to claim 11, wherein the elastic member comprises an external housing, a spring, and a push rod, the external housing sleeves on the push rod, and the external housing is in sliding fit with the push rod;

the spring is disposed in the external housing, a first end of the spring is connected to the external housing, a second end of the spring is connected to the push rod, and the spring is capable of pushing the push rod to slide along the external housing; and one of the push rod and the external housing is connected to the first housing, and the other one of the push rod and the external housing is connected to the first section of the screen assembly.

13. The electronic device according to claim 1, wherein the first housing is provided with a first teeth structure, the second housing is provided with a second teeth structure, the first teeth structure is meshed with the second teeth structure, and in a case that the first housing rotates, the first housing drives, through the first teeth structure and the second teeth structure, the second housing to rotate.

\* \* \* \* \*